United States Patent [19]

Saitoh

[11] Patent Number: 5,106,565

[45] Date of Patent: Apr. 21, 1992

[54] METHOD FOR MANUFACTURING HERMETICALLY SEALING APPARATUS FOR SEALING TWO MEMBERS WHICH ROTATE RELATIVE TO EACH OTHER

[75] Inventor: Takayuki Saitoh, Fukushima, Japan

[73] Assignee: NOK Corporation, Tokyo, Japan

[21] Appl. No.: 627,892

[22] Filed: Dec. 13, 1990

Related U.S. Application Data

[63] Continuation of Ser. No. 260,406, Oct. 20, 1988, abandoned.

[30] Foreign Application Priority Data

Mar. 27, 1987 [JP] Japan .................................. 62-45444

[51] Int. Cl.⁵ ...................... B29C 43/18; B29D 31/00; F16J 15/32
[52] U.S. Cl. ..................................... 264/263; 264/127; 264/268; 264/273; 277/35; 277/37; 425/DIG. 47
[58] Field of Search ................... 277/35, 152, 153, 47; 264/262, 263, 266, 268, 127, 273; 425/DIG. 47

[56] References Cited

U.S. PATENT DOCUMENTS

| 2,208,482 | 7/1940 | Victor ............................ 277/35 X |
| 2,249,141 | 7/1941 | Johnson .................... 425/DIG. 47 |
| 2,867,457 | 1/1959 | Riesing et al. .................. 277/153 |
| 3,270,373 | 9/1966 | Jagger et al. .................. 264/262 X |
| 4,126,320 | 11/1978 | Pendleton ...................... 277/152 |
| 4,131,285 | 12/1978 | Denton et al. .............. 277/152 X |
| 4,159,298 | 6/1979 | Bainard ...................... 264/263 X |
| 4,171,561 | 10/1979 | Bainard et al. ............ 264/268 X |

Primary Examiner—Allan N. Shoap
Attorney, Agent, or Firm—Kenyon & Kenyon

[57] ABSTRACT

A hermetically sealing apparatus comprises: a first seal ring made of a rubber-like resilient material and adapted to seal two members which rotate relative to each other; a second seal ring made of a resin and disposed adjacent to the first seal ring on the atmosphere side; and a backup ring secured to the first seal ring. The backup ring has a flange for clamping both the first and second seal rings. The flange is provided with a plurality of holes in such a manner that a portion of the second seal ring contacting the flange bites into the plurality of holes owing to a molding pressure of the first seal ring.

1 Claim, 2 Drawing Sheets

METHOD FOR MANUFACTURING HERMETICALLY SEALING APPARATUS FOR SEALING TWO MEMBERS WHICH ROTATE RELATIVE TO EACH OTHER

This application is a continuation of application Ser. No. 07/260,406 filed Oct. 20, 1988, now abandoned.

BACKGROUND OF THE INVENTION

The present invention relates to a hermetically sealing apparatus which is adapted to seal two members which rotate relative to each other.

Conventionally, for instance, an apparatus shown in FIG. 3 is known as a hermetically sealing apparatus of this type. In this conventional example, the hermetically sealing apparatus is provided with a first seal ring having a seal lip 100 made of a rubber-like resilient material, a tip 102 of the seal lip 100 abuts against a rotating shaft, thereby constituting a first seal portion. The hermetically sealing apparatus is further provided with a second seal ring having a seal lip 103 made of a resin and extending along a side surface of the first seal ring on the atmosphere side, and a tip 104 of the seal lip 103 abuts against the rotating shaft, thereby constituting a second seal portion. The seal lip 100 made of the rubber-like resilient material is backed up by the seal lip 103 which has a low level of frictional resistance so as to restrain an increase in the contact surface pressure of a hermetic fluid under high pressure, thereby restraining an increase in sliding resistance between the seal lip 100 and the rotating shaft. This arrangement makes it possible to reduce the abrasion of the seal lip 100 and improve the durability thereof. The second seal ring is held by a backup ring 105. In order to fabricate such a hermetically sealing apparatus, the following procedure is generally taken: Using a rubber-like resilient material, the seal lip 100 is obtained by a process of forming the seal lip 100 by vulcanization. The resin-made seal lip 104 is obtained by subjecting a resin-made seal lip to a bending process. The, these seal lips 100 and 104 are superposed on the metallic reinforcing ring 105 and are fixed to each other by bonding with an adhesive or by calking a metallic outer ring 106, securing the ends of the superposed members.

However, in accordance with the arrangement of such a conventional example described above, since the affinity between the resin and rubber is poor and it is impossible to obtain a sufficient bonding force, it is necessary to provide a process in which the joint surface of the resin-made seal lip on the rubber-like seal lip side is preliminarily processed by means of metal sodium or the like for good fitting to the adhesive before jointing is effected. When securing by calking is effected, it is necessary to use the metallic outer ring, so that the number of parts disadvantageously increases. Accordingly, in cases where either of the fixing methods is used, the number of processes involved until completion of the hermetically sealing apparatus becomes undesirably numerous. Hence, there has been a drawback in that the production cost is high.

SUMMARY OF THE INVENTION

Accordingly, an object of the present invention is to provide a hermetically sealing apparatus which is capable of sufficiently sealing two members which rotate relative to each other by positively securing members without employing an extra member or an extra process, thereby overcoming the above-described drawbacks of the prior art.

To this end, in accordance with the present invention, there is provided a hermetically sealing apparatus comprising: a first seal ring made of a rubber-like resilient material and adapted to seal two members which rotate relative to each other; a second seal ring made of a resin and disposed adjacent to the first seal ring on the atmosphere side; and a backup ring secured to the first seal ring, wherein the backup ring has a flange for clamping both the first and second seal rings, and the flange is provided with a plurality of holes in such a manner that a portion of the second seal ring contacting the flange bites into the plurality of holes owing to a molding pressure of the first seal ring.

In the hermetically sealing apparatus constructed as described above, the backup ring is provided with a plurality of holes. In fabrication, the backup ring and the second seal ring are arranged in a mold, and a rubber-like resilient material is then poured into the mold to allow the same to vulcanize. At that juncture, the resin of the second seal ring bites into the holes of the backup ring owing to a pressure applied from the side of the first seal ring made of a rubber-like resilient material, so that projections corresponding to the holes of the backup ring are formed. Consequently, the second seal ring is clamped by the first seal ring and the backup ring and is thus jointed and fixed. Hence, it is possible to obtain a hermetically sealing apparatus which substantially reduces the number of assembly processes involved without using a special fixing method and which can be produced at low costs.

The above and other objects of the present invention will become more apparent when read in conjunction with the following description of the invention.

DESCRIPTION OF THE PREFERRED EMBODIMENT

Figure 1:
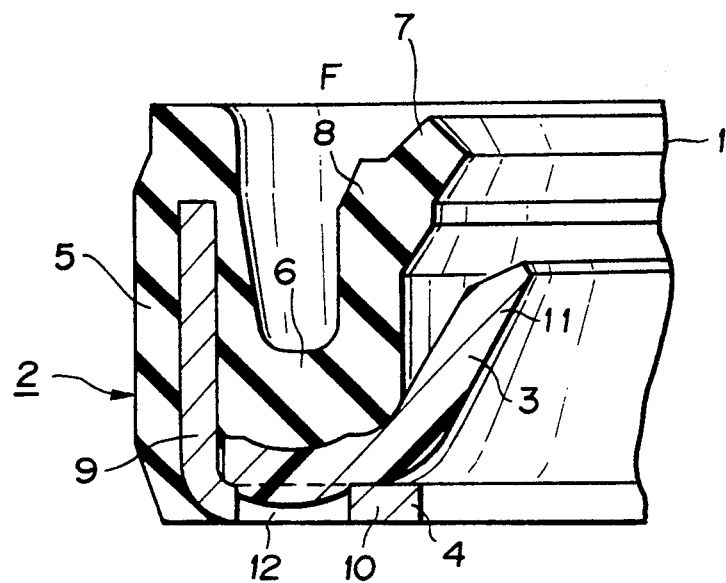
FIG. 1 is a cross-sectional view of a hermetically sealing apparatus in accordance with the present invention.

FIG. 1 shows a hermetically sealing apparatus 1 in accordance with the present invention. The arrangement of this hermetically sealing apparatus 1 is such that a first seal ring 2 disposed on the hermetically sealed fluid side and made of a rubber-like resilient material, a second seal ring 3 made of a reinforced plastic (PTFE), and a metallic backup ring 4 are combined and fixed. A seal ring 3 is clamped by the first seal ring 2 and the backup ring 4. In other words, the first seal ring 2 comprises: an outer tube portion 5 fitted with an inner peripheral portion of a housing (not shown); an annular support portion 6 extending from a mid-portion of the outer tube portion 5 inwardly in the radial direction; and a seal lip 8 for forming a seal portion with a tip 7 of the lip seal 8 hermetically abutting against a surface of a shaft. The first seal ring 2 is assembled by being baked integrally with the backup ring 4. The backup ring 4 has an L-shaped cross section, and comprises a cylindrical portion 9 which is embedded in the outer tube portion 5 of the first seal ring material 2 to serve as a core for the outer tube 5, as well as a flange 10 extending from a side end portion of the cylindrical portion 9 inwardly in the radial direction. The second seal ring 3 is clamped by this flange 10 and the support portion 6 of the first seal ring 2.

The second seal ring 3 is a tabular member formed by a resin material such as a reinforced plastic (PTFE), and an inside-diameter side thereof is bent toward a hermetic fluid side to constitute a seal lip 11. A tip of this resin-made seal lip 11 extends to a tip of the seal lip 8 of the first seal ring material 2 so as to support a force applied to the seal lip 8 of the first seal ring material 2.

A plurality of fixing holes 12 for preventing the rotation of the second seal ring 3 are provided in a contact portion between the second seal ring 3 and the backup ring 4, i.e., in the flange 10 of the backup ring 4. Namely, as shown in FIG. 1, the holes 12 are provided in a central portion of the flange 10 of the backup ring 4 at predetermined intervals in a circumferential direction. The arrangement is such that the seal ring 3 enters these holes 12 during vulcanization molding.

In the hermetically sealing apparatus thus constructed, when the rotating shaft moves relative to the housing, since the second seal ring 3 is fitted in the holes 12 provided in the backup ring 4 at the time of molding, so that the second seal ring 3 is prevented from coming off the backup ring 4 owing to a frictional force applied by the rotation of the rotating shaft. In addition, since the seal ring is fixed to the housing, the seal ring does not move. Consequently, since the respective parts are secured positively in such a manner that no circumferential offset occurs among the first seal ring 2, the second seal ring 3, and the backup ring 4, so that it is possible to maintain stable hermetic performance.

Figure 2:
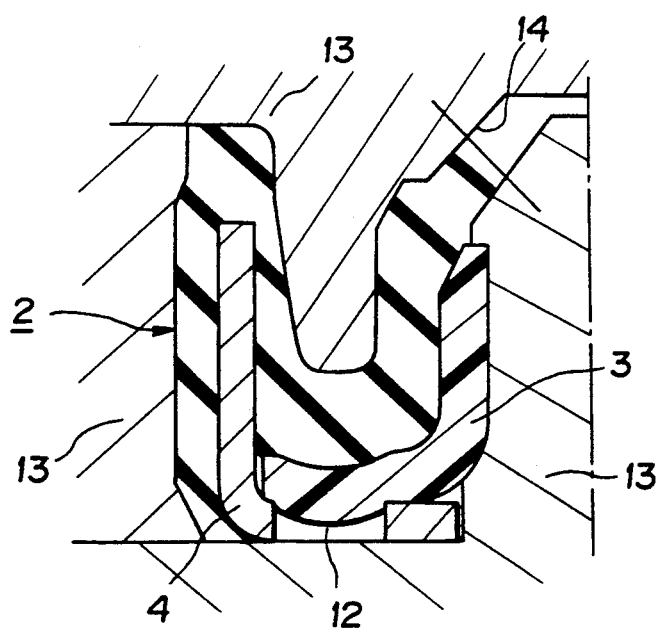
FIG. 2 is a cross-sectional view of the hermetically sealing apparatus illustrating a method of assembling members of the hermetically sealing apparatus shown in FIG. 1.
Figure 3:
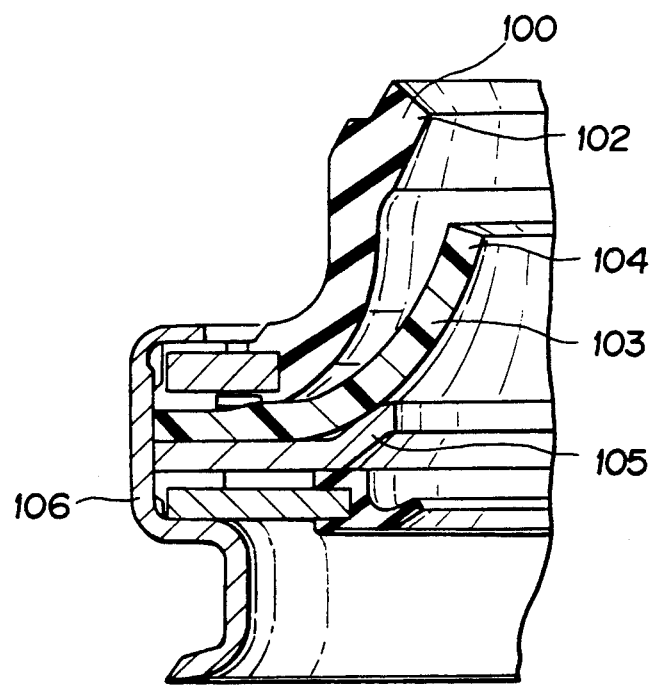
FIG. 3 is a partial cross-sectional view of a conventional hermetically sealing apparatus.

Referring now to FIG. 2, a description will now be given of a method of fabricating the hermetically sealing apparatus having the above-described construction. FIG. 2 shows a process for vulcanizing a rubber material for forming the first seal ring 2. The metallic backup ring 4 processed separately in advance and a seat of the resin-made second seal ring 3 are arranged in a cavity 14 of a mold. Then, after dies 13 are closed, the rubber material is filled into the cavity 14 in the injection molding method, whereas before dies 13 are closed, unvalcanized rubber material of the amount more than necessary is applied on the resin material and the dies 13 are then closed in the compression molding method, to effect the vulcanization molding of the first seal ring 2. At this juncture, the second seal ring 3 is pressed against the backup ring 4 by a filling pressure of the rubber material, and the second seal ring 3 enters the holes 12 owing to this pressing force. As a result, projections corresponding to the holes formed in the flange 10 are formed, thereby firmly securing the second seal ring 3 to the backup ring 4. Subsequently, after the rubber material has hardened, the dies are opened and the molding is removed. During molding, the tip portion of the seal ring 3 is jointed to the first seal ring 2 inwardly in the radial direction thereof. However, after the dies are opened and the molding is removed, the tip portion of the second seal ring 3 is separated from the first seal ring 2 and returns to its predetermined position.

Thus, in the hermetically sealing apparatus in accordance with the present invention, the second seal ring and the backup ring are jointed and fixed to each other during the vulcanization molding of the first seal ring, and the number of processes for assembling various members can be reduced. Hence, it is possible to increase the productivity and reduces the production cost. Furthermore, since the number of assembly processes can be reduced, the frequency of occurrence of assembly errors can also be reduced, thereby making it possible to increase the product quality.

I claim:

1. A method of manufacturing a hermetic sealing apparatus for sealing two members rotating relative to each other with a lubricant on one side and atmosphere on another side, said hermetic sealing apparatus comprising a first annular seal ring made of rubber-like resilient material on the lubricant side, a second annular seal ring made of resin material on the atmosphere side, and an annular metal backup ring, said manufacturing method comprising the steps of:

providing a mold;

placing said annular metal backup ring in said mold, said annular metal backup ring having a cylindrical portion and a radially inward extending flange portion with a plurality of circumferentially spaced holes formed in said flange portion;

placing said second annular seal ring entirely made of polytetrafluoroethlene in said mold with a circumferential portion of said second annular seal ring covering said flange portion of said annular metal backup ring;

placing the rubber-like resilient material for forming said first annular seal ring in said mold, said rubber-like resilient material contacting said cylindrical portion of said annular metal backup ring and an radial side surface of said second annular seal ring opposite said circumferential portion covering said flange portion, and subjecting said rubber-like resilient material to pressure to form said first annular seal ring; and deforming said second annular seal ring so as to protrude into each of said holes of said flange portion of the annular metal backup ring by the pressurized rubber-like resilient material;

whereby said protruding of the second annular seal ring into the holes of said flange portion of the annular metal backup ring firmly secures and fixes said second annular seal ring between said first seal ring and said flange portion.

* * * * *